United States Patent [19]

Breitenfellner et al.

[11] 4,131,595
[45] Dec. 26, 1978

[54] THERMOPLASTIC MOULDING COMPOSITIONS

[75] Inventors: Franz Breitenfellner, Holger Andreas, both of Bensheim, Germany

[73] Assignee: Ciba-Geigy Corporation, Ardsley, N.Y.

[21] Appl. No.: 769,357

[22] Filed: Feb. 16, 1977

[30] Foreign Application Priority Data

Feb. 26, 1976 [CH] Switzerland .................. 2399/76

[51] Int. Cl.² .................................................. C08K 3/40
[52] U.S. Cl. .................................... 260/40 R; 260/860; 260/873
[58] Field of Search .................. 260/860, 873, 40 R

[56] References Cited

U.S. PATENT DOCUMENTS

| | | | |
|---|---|---|---|
| 3,644,267 | 2/1972 | Jackson et al. | 260/873 X |
| 3,673,139 | 6/1972 | Hrach | 260/873 X |
| 3,742,087 | 6/1973 | Nield | 260/40 R X |
| 3,953,394 | 4/1976 | Fox et al. | 260/873 X |
| 4,052,356 | 10/1977 | Breitenfellner et al. | 260/40 R |

FOREIGN PATENT DOCUMENTS 1417535  12/1975  United Kingdom.

*Primary Examiner*—Sandra M. Person
*Attorney, Agent, or Firm*—Luther A. R. Hall

[57] ABSTRACT

Copolyesters of terephthalic acid, 1,4-butanediol and an aliphatic dicarboxylic acid of the formula I

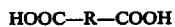 (I)

wherein R represents a divalent aliphatic hydrocarbon group containing not more than 34 carbon atoms, are eminently suitable as impact modifiers for polyalkylene terephthalates for improving the toughness properties.

15 Claims, No Drawings

THERMOPLASTIC MOULDING COMPOSITIONS

The present invention provides a thermoplastic moulding composition with improved toughness properties which contains a polyalkylene terephthalate and a copolyester based on poly-1,4-butylene terephthalate.

Polyalkylene terephthalates, in particular polyethylene and poly-1,4-butylene terephthalate, in both non-reinforced and reinforced form, are useful moulding compounds for the manufacture of all kinds of finished parts which possess very good mechanical properties. They are particularly suitable for use as engineering plastics, that is to say for manufacturing moulded articles which can be subjected to high mechanical stresses.

A disadvantage of these moulded articles made from polyalkylene terephthalates is their relatively low impact strength, which limits their possible end uses. This disadvantage is particularly noticeable in thin-walled moulded articles and in those having edges and corners.

Reinforcing fillers, for example glass fibres, can be added to the base polymers in order to improve the impact strength. This addition also substantially improves many other properties. But precisely this improvement is unnecessary for many end uses. It is therefore desirable to add an agent which improves the notched impact strength without other mechanical properties being substantially changed. These agents are called impact modifiers. It is furthermore desirable to use base polymers with a high impact strength in reinforced formulations too.

In DT-OS No. 2,331,826 it is proposed to mix aliphatic polylactones, for example poly-ε-caprolactone, as an additive of this kind with poly-1,4-butylene terephthalate. These polylactones possess as a rule melting ranges in the region of approx. 60° C., whereby application possibilities at higher temperature are restricted, in particular when use over an extended period of time is envisaged. This restriction is a considerable disadvantage when reinforced formulations are concerned, since the very addition of reinforcing agent is intended to improve the performance properties also at elevated temperature.

A further disadvantage consists in the fact that the properties of the base polymer can be modified to a relatively high degree by the aliphatic character of the additive, especially if considerable amounts of a polylactone are added.

It is the task of the present invention to provide moulding compounds based on polyethylene, poly-1,3-propylene or poly-1,4-butylene terephthalate, which possess an improved notched impact strength and whose other mechanical properties, for example flexural strength or dimensional stability under heat, change to only such a small degree that a technical use of articles manufactured from the moulding compound is assured. In addition, the additive used for this purpose shall be similar to, and readily compatible with, the base polymer in order to effect only slight changes in the general behaviour of the base polymer, for example processing possibilities and properties of the manufactured moulded articles.

Accordingly, the invention provides a moulding compound based on polyester mixtures consisting of a polyalkylene terephthalate and a further thermoplastic polyester, said moulding compound containing a. 95 to 60% by weight, referred to the polyester mixture, of a polyethylene, poly-1,3-propylene or poly-1,4-butylene terephthalate or of mixtures thereof, and b. 5 to 40% by weight of a copolyester of terephthalic acid, 1,4-butanediol and an aliphatic dicarboxylic acid of the formula I

HOOC—R—COOH        (I)

wherein R represents a divalent aliphatic hydrocarbon group having not more than 34 carbon atoms.

Polyethylene, poly-1,3-propylene and poly-1,4-butylene terephthalate, of which the moulding compound preferably contains 90 to 70% by weight, are thermoplastic polyesters which have long been known in the art (cf. for example DT-OS No. 2,042,447) and which are obtained by known processes by transesterification and polycondensation of terephthalic acid or the polyester-forming derivatives thereof and ethylene glycol, 1,3-propanediol or 1,4-butanediol, in the presence of catalysts. These polyesters have as a rule a relative viscosity of 1.5 to 4, preferably 1.5 to 3.5. The particularly preferred polyalkylene terephthalate is poly-1,4-butylene terephthalate.

The copolyesters used as impact modifiers are likewise known and can be prepared by the same methods. However, special processes are also known, for example from DT-OS No. 2,336,026. They possess in general a relative viscosity of 1.5 to 4, preferably 1.5 to 3.5. The amount of dicarboxylic acid of the formula I is preferably 5 to 30 molar percent, in particular 10 to 25 molar percent, referred to the copolyester. The group R in formula I, which represents in particular linear or branched alkylene, contains preferably 5 to 34, in particular 8 to 34, carbon atoms.

Most preferably the copolyesters have a notched impact strength of at least 20cm kp/cm$^2$, measured in accordance with DIN 53 453, and in particular show no rupture in this method of measurement.

Examples of suitable dicarboxylic acids of the formula I are: pentylmalonic acid, octadecylmalonic acid, glutaric acid, succinic acid, octadecylsuccinic acid, pimelic acid, suberic acid, adipic acid, trimethyladipic acid, dodecanedicarboxylic acid, pentadecanedicarboxylic acid, octadecanedicarboxylic acid, and dimeric acids. Dimeric acids are dimerisation products of unsaturated carboxylic acids, for example oleic acids. Such copolyesters on the basis of poly-1,4-butylene terephthalate are described for example in DT-OS No. 2,340,959. A particularly preferred dicarboxylic acid of the formula I is sebacic acid.

If the number of carbon atoms contained by the dicarboxylic acids of the formula I is low, the copolyester employed will contain a greater amount of dicarboxylic acid as condensation component so that the preferred minimum impact strenght is attained in the copolyester.

A particularly useful moulding compound of the present invention contains approx. 85% by weight of poly-1,4-butylene terephthalate and approx. 15% by weight of copolyester with 20 molar percent of sebacic acid.

The moulding compound of the present invention can be obtained by mixing granulates of the polyalkylene terephthalates and the copolyesters by regranulating such granulates from the molten state. However, it is also possible to process granulate mixtures of the polyalkylene terephthalates and the copolyesters as moulding compound of the invention direct to give moulded articles, for example by injection moulding or extrusion.

Further customary inert additives, for example inorganic or organic pigments, fluorescent whitening agents, matting agents, crystallisation promoters, mould release agents or anti-oxidants, can be added during the manufacture of the moulding compounds of the invention or during the manufacture of the polyalkylene terephthalates or copolyesters.

The addition of reinforcing fillers is particularly advantageous, for example, asbestos, metal powder, kaolin, wollastonite, metal whiskers and especially glass fibres, which can normally be added in amounts of 5 to 60%, preferably 10 to 40% by weight, referred to the moulding compound. The improvement in the impact strength in the moulding compound itself increases the impact strength more greatly when such reinforcing fillers are added.

The same advantage accrues if flame retardants are added, generally in amounts from 5 to 20%, preferably from 5 to 15% by weight, referred to the moulding compound. These agents as a rule impair the toughness properties and the use of a copolyester according to the invention counteracts this.

Flame retardants are halogen-containing organic compounds which can be used by themselves or together with compounds of the elements of the 5th main group of the Periodic Table, in particular antimony trioxide. Examples of such compounds are: tetrafluoro- or tetrabromophthalic anhydride, tetra- or decabromobiphenyl ether, tetrachlorobiphenylsulphoxide, hexachlorobiphenyl, polytribromostyrene, and, in particular, decabromobiphenyl.

Surprisingly, moulded articles obtained from the moulding compounds of the invention have an improved impact strength. It is particularly surprising that evidently the copolymers act as impact modifiers without thereby changing the other mechanical properties, for example the flexural strength or dimensional stability under heat in such a way that a technical use would no longer be possible The copolyesters melt as a rule only at temperatures of above 100° C. or substantially higher, so that a use of the moulded articles obtained from the moulding compounds of the invention is assured at higher temperatures.

The moulding compounds of the invention are useful thermoplastic materials from which various kinds of moulded articles can be manufactured by the customary moulding processes, such as casting, in particular injection moulding or extrusion. Examples of such moulded articles are: fuel or compressed air piping, electrical wiring coatings, technical appartus parts, sections or electrical insulations. The moulding compounds can also be used as sinter powders for surface coatings as well as for manufacturing films, sheets and filaments.

The following Examples will serve to illustrate the invention in more detail. The relative viscosity of the polyesters is determined at 30° C. using solutions of 1 g of polyester in 100 ml of a solvent consisting of equal parts of phenol and symmetrical tetrachloroethane.

A. Manufacture of the copolyesters 1. (PBT with 10 mol.% of dimethyl sebacate)

A 10 liter reactor equipped with stirrer, nitrogen, inlet, separating column and thermometer is charged with 3104 g of dimethyl terephthalate (40 ml.% of DMT), 3600 g of butanediol, 920 g of dimethyl sebacate (10 mol.%) and 2.3 g of tetraisopropyltitanate and the mixture is heated to 140° C. With stirring and introduction of nitrogen, 98% of the theoretical amount of methanol is distilled off in the course of 2½ hours, the temperature of the reaction mixture rising to 217° C.

The resultant transesterification product is charged into a second reactor and after the reaction mixture has been heated to 240° C., a vacuum of 140 torr is applied in the course of half an hour with a water jet pump. While raising the reaction temperature to 250° C., the vacuum is increased to 0.30 torr over 60 minutes with a vacuum pump. Reaction temperature and vacuum are then kept for 3 hours at these reaction conditions. The reactor is then discharged and the resultant polyester is granulated with a relative viscosity of 2.59. The melting point of the copolyester is 187° C.

2. (PBT with 20 mol.% of dimethyl sebacate)

A copolyester with a relative viscosity of 2.74 and a melting point of 150° C. is synthesised in analogous manner from 2328 g of dimethyl terephthalate, 3600 g of butanediol-1,4, 1840 g of dimethyl sebacate (20 mol.%) and 2.3 g of tetraisopropyl titanate.

3. (PBT with 30 mol.% of dimethyl sebacate)

A copolyester with a relative viscosity of 3.14 and a softening point of 104° C. is synthesised in analogous manner from 1552 g of dimethyl terephthalate, 3600 g of butanediol-1,4, 2764 g of dimethyl sebacate (30 mol.%) and 2.3 g of tetraisopropyl titanate.

B. EXAMPLES

EXAMPLE 1

A granulate mixture consisting of 90% by weight of poly-1,4-butylene terephthalate (PBT) with a relative viscosity of 2.70 and 10% by weight of PBT copolyester with 10 mol.% of dimethyl sebacate ($\eta rel = 2.59$) is regranulated at cylinder temperatures of 240° C. with the aid of a single screw extruder (screw diameter = 45 mm). After the granulates have been dried, samples measuring 6 × 4 × 50 mm are prepared in an injection moulding machine of the Arburg Allrounder type under the following conditions:

cylinder temperatures: 230°/250°/270° C. (rising from the feed hopper to the jet)
mould temperature: 80° C.
cycle time: 45 sec The impact strength in accordance with DIN 53 453 is determined at 23° C. using 20 samples. The maximum flexural strength is also determined using groups of 5 samples in accordance with DIN 53 452 (support interval 40 mm, test temperature 23° C. The results summarised in Table 3 are obtained (average values).

EXAMPLE 2

In the same manner as described in Example 1, a granulate mixture consisting of 70% by weight of poly-1,4-butylene terephthalate and 30% by weight of PBT copolyester with 10 mol.% of dimethyl sebacate is regranulated and processed to moulded articles which are tested for their impact strength and maximum flexural strength. The results are reported in Table 1.

EXAMPLE 3

A granulate mixture consisting of 90% by weight of poly-1,4-butylene terephthalate ($\eta rel = 2.70$) and 10% by weight of PBT copolyester with 20 mol.% of dimethyl sebacate ($\eta rel = 2.74$), is injection moulded direct to give moulded articles measuring 6 × 4 × 50 mm at cylinder temperatures of 230°/250°/270° C. (rising from the feed hopper to the jet), a moulding temperature of 80° C. and a cycle time of 45 sec. These moulded articles are tested for the proerties listed in Table 1.

EXAMPLE 4

In the same way as described in Example 3, moulded articles are manufactured from the following granulate mixture: 70% by weight of poly-1,4-butylene terephthalate and 30% by weight of PBT copolyester with 20 mol.% of dimethyl sebacate. The properties of these moulded articles are summarised in Table 1.

EXAMPLE 5

In the same way as described in Example 3, moulded articles are manufactured from the following granulate mixture: 90% by weight of polybutylene terephthalate and 10% by weight of PBT copolyester ($\eta$rel = 3.14) with 30 mol.% of dimethyl sebacate. The properties of these moulded articles are summarised in Table 1.

EXAMPLE 6 (COMPARISON EXAMPLE)

Polybutylene terephthalate ($\eta$rel = 2.70) is injection moulded to give moulded articles measuring 6 × 4 × 50 mm at cylinder temperatures of 230°/250°/270° C. (rising from the feed hopper to the jet), a moulding temperature of 80° C. and a cycle time of 45 sec. These moulded articles are tested for their impact strength and the values are reported in Table 1.

Table 1

| Example | Impact strength according to DIN 53 453, 23° C cm kp/cm$^2$ | max.flexural strength in accordance with DIN 53 452, 23° C kp/cm$^2$ |
| --- | --- | --- |
| Comparison Example (6) | 4 | 850 |
| 1 | 6 | 840 |
| 2 | 7 | 680 |
| 3 | 7 | 770 |
| 4 | 16 | 550 |
| 5 | 9 | 640 |

It is observed that the moulding compounds of the invention possess significantly higher impact strength values and that the flexural strength values do not fall so low through the addition of a copolyester that the moulding compounds would be no longer suitable for technical use.

EXAMPLE 7-8

The moulding compounds of the compositions listed in Table 2 are homogenised by regranulation and processed to moulded articles measuring 6 × 5 × 50 mm and 15 × 4 × 160 mm at cylinder temperatures of 230°/250°/270° C. (rising from the feed hopper to the jet), a mould temperature of 80° C. and a cycle time of 45 sec. The properties of these moulded articles are reported in Table 2.

It follows from this table that the moulding compounds of the invention (Example 7 and 8) are characterised by a greater toughness compared with the comparison moulding compounds without, for example, a noticeable decrease in their dimensional stability under heat.

Table 2

| Example | Composition | Impact strength according to DIN 53 453 23° C (cmkp/cm$^2$) | Notched impact strength according to DIN 53 453 23° C (cm/kp/cm$^2$) | Dimensional stability under heat ISO/R 75 Process A (° C) |
| --- | --- | --- | --- | --- |
| 7 | 74% by weight of a mixture consisting of 83% by weight of PBT* and 17% by weight of PBT copolyester with 20 mol.% of dimethyl sebacate 26% by weight of glass fibres | 41 | 11 | 200 |
| 8 | 62.5% by weight of a mixture consisting of 85% by weight of PBT* and 15% by weight of PBT copolyester with 20 mol.% of dimethyl sebacate 27% by weight of glass fibres 7% by weight of decabromodiphenyl 3.5% by weight of Sb$_2$O$_3$ | 28 | 8 | 203 |
| Comparison Example | 74% by weight of PBT* 26% by weight of glass fibres | 38 | 8 | 203 |
| Comparison Example | 62.5% by weight of PBT* 27.0% by weight of glass fibres 7.0% by weight of decabromodiphenyl 3.5% of Sb$_2$O$_3$ | 24 | 6 | 203 |

*$\eta$ rel = 2.20

EXAMPLE 9

A granulate mixture consisting of 90% by weight of poly-1,4-butylene terephthalate ($\eta$rel = 2.74) and 10% by weight of PBT copolyester with 20 mol.% of adipic acid ($\eta$rel = 2.70) is injected moulded direct to give sample moulded articles measuring 6 × 4 × 50 mm at cylinder temperatures of 230°/230°/230° C., a mould temperature of 80° C. and a cycle time of 40 sec. These samples are tested for the properties listed in Table 3. (The manufacture of the PBT copolyester is carried out as described in A) 2.

EXAMPLE 10

In the same manner as described in Example 9, moulded articles are manufactured from the following granulate mixture: 70% by weight of poly-1,4-butylene terephthalate ($\eta$rel = 2.74) and 30% by weight of PBT copolyester with 20 mol.% of adipic acid ($\eta$rel = 2.70). The properties of these moulded articles are reported in Table 3.

EXAMPLE 11

In the same manner as described in Example 9, moulded articles are manufactured from the following granulate mixture: 90% by weight of poly-1,4-butylene terephthalate ($\eta$rel = 2.74) and 10% by weight of PBT copolyester with 20 mol.% of azelaic acid ($\eta$rel =

2.66). The properties of the moulded articles are reported in Table 3. (The manufacture of the PBT copolyester is carried out as described in A) 2.

EXAMPLE 12

In the same manner as described in Example 9, moulded articles are manufactured from the following granulate mixture: 70% by weight of poly-1,4-butylene terephthalate ($\eta$rel = 2.74) and 30% by weight of PBT copolyester with 20 mol.% of azelaic acid ($\eta$rel = 2.66). The properties of the moulded articles are reported in Table 3.

Table 3

| Example | Notched impact strength DIN 53 453, 23° C, cmkp/cm² | max.flexural strength in according with DIN 53 452, 23° C, kp/cm² |
| --- | --- | --- |
| 9 | 6 | 790 |
| 10 | 16 | 540 |
| 11 | 6 | 790 |
| 12 | 13 | 520 |

We claim:

1. A moulding compound based on polyester mixtures consisting of a polyalkylene terephthalate and a further thermoplastic polyester, said moulding compound containing
   a. 95 to 60% by weight, referred to the polyester mixture, of poly(1,4-butylene terephthalate), and
   b. 5 to 40% by weight of a copolyester of terephthalic acid, 1,4-butanediol and aliphatic dicarboxylic acid of the formula I

HOOC—R—COOH          (I)

wherein R represents a divalent aliphatic hydrocarbon group having not more than 34 carbon atoms and wherein the acid of formula I is from 5 to 30 molar percent of the copolyester.

2. A moulding compound according to claim 1, wherein the copolyester has a minimum impact strength of 20 cmkp/cm², measured in accordance with DIN 53 453 at 23° C., and exhibits no rupture when this measurement is made.

3. A moulding compound according to claim 1, wherein the radical R in the aliphatic dicarboxylic acids of the formula I contains from 5 to 34 carbon atoms.

4. A moulding compound according to claim 1, wherein the copolyester contains as condensation component 10 to 25, molar percent of dicarboxylic acid of the formula I.

5. A moulding compound according to claim 1, wherein R in formula I represents linear or branched alkylene.

6. A moulding compound according to claim 1, wherein the copolyester contains sebacic acid as condensation component of formula I.

7. A moulding compound according to claim 1, which contains 90 to 70% by weight of component (a) and 10 to 30% by weight of component (b).

8. A moulding compound according to claim 7, which contains (a) approx. 85% by weight of poly(1,4-butylene terephthalate) and (b) approx. 15% by weight of copolyester with 20 molar percent of sebacic acid.

9. A moulding compound according to claim 1, which contains in addition 5 to 60% by weight of a reinforcing filler.

10. A moulding compound according to claim 1, which contains in addition 5 to 20% by weight of a flame retardant.

11. A moulding compound according to claim 3 wherein the radical R contains from 8 to 34 carbon atoms.

12. A moulding compound according to claim 9 which contains 10 to 40% by weight of filler.

13. A moulding compound according to claim 9 wherein the filler is glass fibers.

14. A moulding compound according to claim 10 which contains 5 to 15% by weight of a flame retardant.

15. A molded article made by injection molding or extrusion of a molding compound according to claim 1.

* * * * *